(12) United States Patent
Lee et al.

(10) Patent No.: US 9,395,841 B2
(45) Date of Patent: Jul. 19, 2016

(54) TOUCH SCREEN CONTROLLER AND METHOD FOR CONTROLLING THE SAME

(71) Applicant: HiDeep Inc, Seongnam-si, Gyeonggi-do (KR)

(72) Inventors: Hwanhee Lee, Daejeon (KR); Sangsic Yoon, Gyeonggi-do (KR); Bonkee Kim, Seoul (KR)

(73) Assignee: HiDeep Inc., Gyeonggi-do (KR)

( * ) Notice: Subject to any disclaimer, the term of this patent is extended or adjusted under 35 U.S.C. 154(b) by 143 days.

(21) Appl. No.: 14/056,652

(22) Filed: Oct. 17, 2013

(65) Prior Publication Data

US 2014/0111472 A1   Apr. 24, 2014

(30) Foreign Application Priority Data

Oct. 18, 2012   (KR) .......................... 10-2012-0116040

(51) Int. Cl.
  *G06F 3/041*   (2006.01)
  *G06F 3/044*   (2006.01)

(52) U.S. Cl.
  CPC .............. *G06F 3/0416* (2013.01); *G06F 3/041* (2013.01); *G06F 3/044* (2013.01)

(58) Field of Classification Search
  USPC .................................................. 345/174, 173
  See application file for complete search history.

(56) References Cited

U.S. PATENT DOCUMENTS

| | | | |
|---|---|---|---|
| 2005/0253814 A1* | 11/2005 | Ghassabian | .................... 345/168 |
| 2009/0256817 A1* | 10/2009 | Perlin | .................... G06F 3/0233 345/174 |
| 2011/0001708 A1* | 1/2011 | Sleeman | ............... G06F 3/0416 345/173 |

FOREIGN PATENT DOCUMENTS

| | | |
|---|---|---|
| JP | 2012-160119 A | 8/2012 |
| KR | 10-2011-0057501 A1 | 6/2011 |
| KR | 10-2012-0031468 A | 4/2012 |

OTHER PUBLICATIONS

Office Action issued by the KIPO on Dec. 24, 2013 in KR No. 10-2012-0116040; 5 pages.

* cited by examiner

*Primary Examiner* — Lixi C Simpson
(74) *Attorney, Agent, or Firm* — Foley & Lardner LLP

(57) ABSTRACT

Disclosed are a touch screen controller and a method for controlling the same, which includes a touch processor which processes at least two touch operation modes independently and respectively in accordance with an object touched on the touch screen.

17 Claims, 10 Drawing Sheets

|     | Y1 | Y2  | Y3 |     |
|-----|----|-----|----|-----|
|     | 3  | 10  | 3  | X1  |
|     | 10 | 100 | 10 | X2  |
|     | 3  | 10  | 3  | X3  |

Fig.7b

|     | Y1 | Y2 | Y3 |     |
|-----|----|----|----|-----|
|     | 8  | 8  | 2  | X1  |
|     | 50 | 50 | 5  | X2  |
|     | 8  | 8  | 2  | X3  |

Fig.8a

|     | Y1 | Y2  | Y3 |     |
|-----|----|-----|----|-----|
|     | 10 | 30  | 10 | X21 |
|     | 30 | 100 | 30 | X22 |
|     | 10 | 30  | 10 | X23 |

Fig.8b

|     | Y1 | Y2 | Y3 |     |
|-----|----|----|----|-----|
|     | 25 | 25 | 8  | X21 |
|     | 50 | 50 | 10 | X22 |
|     | 25 | 25 | 8  | X23 |

TOUCH SCREEN CONTROLLER AND METHOD FOR CONTROLLING THE SAME

CROSS-REFERENCE TO RELATED APPLICATIONS

This application claims the benefit of Korean Application No. 10-2012-0116040, filed on Oct. 18, 2012, the contents of which are hereby incorporated by reference in its entirety into the present disclosure.

BACKGROUND

1. Field

The present invention relates to a touch screen controller and a method for controlling the same.

2. Background

A touch screen is a device for inputting information by performing a touch operation (hereafter, referred to as touch) on the characters or a particular location on the display screen through use of a user's finger, a stylus pen and the like without using an input device like a keyboard or a mouse. The touch screen is used in mobile electronic equipments like PDA, a mobile terminal, a variety of electric home appliances, an automatic teller machine, etc.

When multiple objects access and/or contact with the touch screen by means of the finger and stylus pen, the touch screen is required to simultaneously detect the multiple objects and to detect the shapes of the objects in more detail. For this purpose, it is necessary to measure, identify and distinguish between many kinds of the objects capable of access or contact with the touch screen at the same time. However, devices equipped with a conventional touch screen (including their support software and/or circuits) cannot stably measure, identify, and distinguish between the objects. For example, in a case where two touch screens are provided, this has a significantly reduced space-efficiency. Besides, in a device equipped with a single touch screen, the user may be enabled to switch a finger mode or a stylus mode by adding a separate input-mode conversion button or conversion menu. However, the separate input-mode conversion button requires a high cost and the device becomes more complicated and has a larger volume. Also, regarding the conversion menu, it is very troublesome to enter a desired menu and to change the input mode.

SUMMARY

One embodiment is a touch screen controller that includes a touch processor which processes at least two touch operation modes independently and respectively in accordance with an object touched on the touch screen.

Another embodiment is a method for controlling a touch screen, which includes processing at least two touch operation modes independently and respectively in accordance with an object touched on the touch screen.

BRIEF DESCRIPTION OF THE DRAWINGS

Arrangements and embodiments may be described in detail with reference to the following drawings in which like reference numerals refer to like elements and wherein.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

The embodiment of the present invention will be described in detail with reference to the accompanying drawings.

Figure 1:
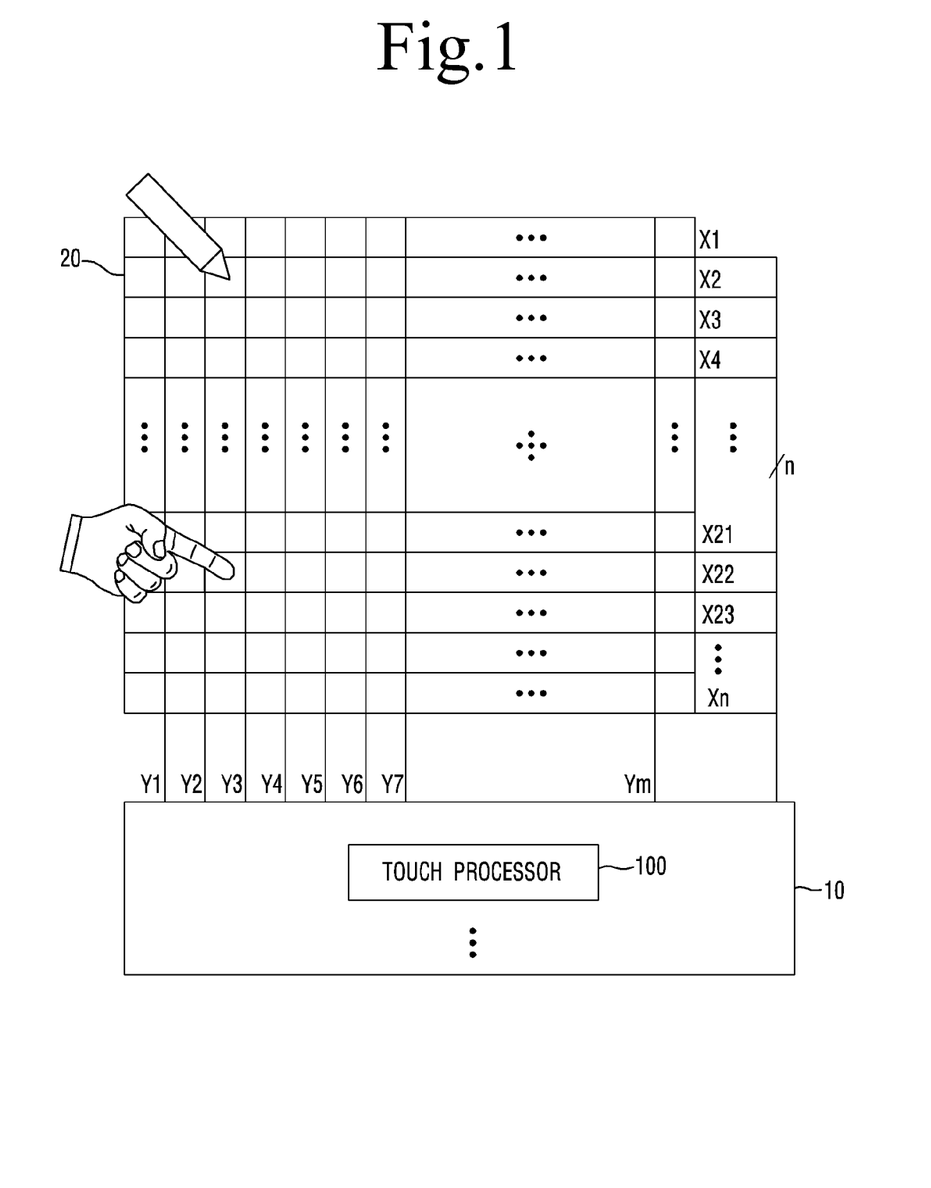
FIG. 1 is a block diagram showing a touch screen controller and a touch screen that is controlled by the touch screen controller in accordance with an embodiment of the present invention.

FIG. 1 is a block diagram showing a touch screen controller and a touch screen that is controlled by the touch screen controller in accordance with an embodiment of the present invention.

As shown in FIG. 1, the touch screen controller 10 according to the embodiment of the present invention includes a touch processor 100 that independently and respectively processes at least two touch operation modes in accordance with an object touched on the touch screen 20. Here, the object above may include a first object and/or a second object different from the first object. Additionally, the first object may mean a human finger 1, and the second object may mean a stylus pen 2. The second object contacts with the touch screen 20, and the touch screen 20 detects an input of the second object.

The touch processor 100 gives a flag to a touch signal detected by the touch screen 20 in correspondence with the touch signal, thereby distinguishing between the first object and the second object touched on the touch screen 20, and independently and respectively processing at least two touch operation modes in accordance with the distinguished object. More specifically, the giving of the flag to the touch signal may mean that the touch processor 100 generates a touch signal entity in a memory and stores information of the flag in a flag field of the touch signal entity.

Here, the touch screen controller 10 including the touch processor 100 in accordance with the embodiment of the present invention transmits the processed result data to a software driver (not shown) included in an electronic device 1000 to be described later in FIG. 11. The software driver translates the result data for an electronic system to recognize.

As a result, the touch signal generated through the contact of the finger 1 with the touch screen 20 is inputted to a finger operation mode, and the touch signal generated through the contact of the stylus pen 2 with the touch screen 20 is inputted to a stylus operation mode, so that the finger operation mode and the stylus operation mode are independently and respectively operated.

Also, the touch processor 100 gives an index to the touch signal given the flag in correspondence with the touch signal, and detects and distinguishes multiple and simultaneous touches on the touch screen 20.

Here, touch screen 20 includes a plurality of drive lines X1, X2, X3, . . . , Xn−1, and Xn arranged in a first direction, a plurality of sensing lines Y1, Y2, Y3, . . . , Ym−1, and Ym arranged to cross the drive lines, and a plurality of sensing cells "A" formed at the crossings of the drive lines X1, X2, X3, . . . , Xn−1, and Xn and the sensing line Y1, Y2, Y3, . . . , Ym−1, and Ym.

The plurality of the drive lines X1, X2, X3, . . . , Xn−1, and Xn and the plurality of the sensing lines Y1, Y2, Y3, . . . , Ym−1, and Ym are formed in different layers on a transparent substrate (not shown). It is preferable that the drive lines and the sensing lines are made of a transparent conductive material. Here, the transparent conductive material may be formed of indium-tin-oxide (ITO), indium-zinc-oxide (IZO) or carbon nano tube (CNT).

Also, an insulation layer (not shown) functioning as a dielectric material is formed between the plurality of the drive lines X1, X2, X3, . . . , Xn−1, and Xn and the plurality of the sensing lines Y1, Y2, Y3, . . . , Ym−1, and Ym.

Though the embodiment shown in FIG. 1 takes an example in which the drive lines X1, X2, X3, . . . , Xn−1, and Xn and the sensing lines Y1, Y2, Y3, . . . , Ym−1, and Ym are arranged to orthogonally cross each other, this is just an embodiment. They may be also arranged to cross in the form of other geometrical structures (a concentric line and a radial line of a polar coordinate arrangement), etc.

Hereafter, the touch processor 100 shown in FIG. 1 will be described in detail.

Figure 2:
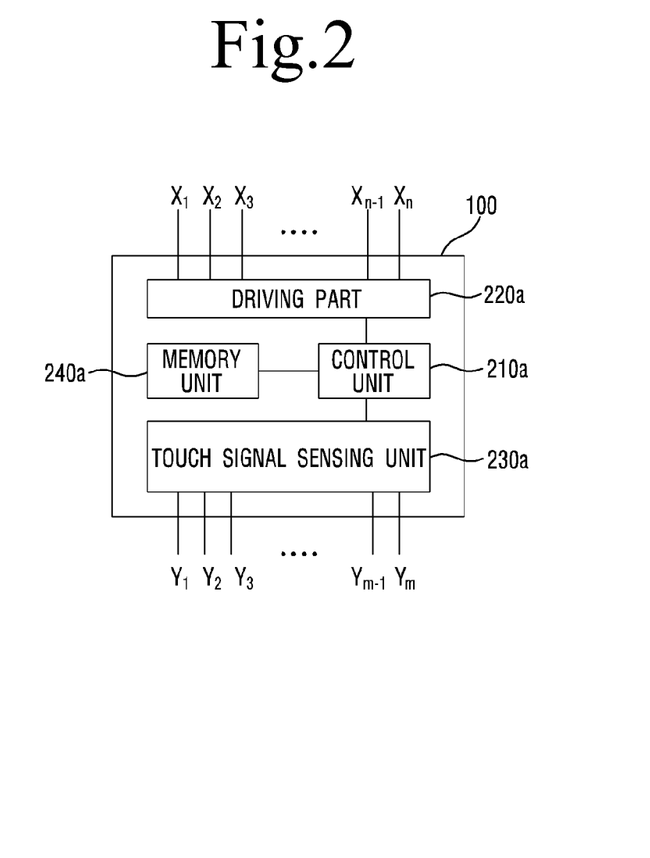
FIG. 2 is a block diagram showing a first embodiment of a touch processor shown in FIG. 1.

FIG. 2 is a block diagram showing a first embodiment of a touch processor shown in FIG. 1

As shown in FIG. 2, the touch processor 100 may include a control unit 210a and a memory unit 240a.

The control unit 210a gives a flag to each touch signal and determines the kind of an object that has inputted the touch signal. The control unit 210a identifies the feature information of the first object or the feature information of the second object, and gives a flag to a touch signal corresponding to the identified feature information, thereby distinguishing between the first object and the second object. Here, the touch processor 100 is able to independently and respectively process at least two touch operation modes in accordance with the distinguished object. Also, the control unit 210a gives the same index to a touch signal satisfying an index matching condition among the touch signals given the flag, and gives a different index to a touch signal not satisfying the index matching condition. Accordingly, in the touch processor 100, the control unit 201a gives the index to the corresponding touch signal, so that it is possible to detect and distinguish multiple and simultaneous touches on the touch screen 20, and to distinguish single touch and dual touch. Here, the index matching condition may be obtained by using, for example, a touch input time difference or a distance between the touches, etc.

The memory unit 240a may be comprised of a program memory and data memories. Here, the program memory may store a program to drive the touch processor 100. The data memory may store the flag and/or the index.

In the embodiment, the touch processor 100 may further include a driving part 220a and a touch signal sensing unit 230a.

The driving part 220a may sequentially apply a driving signal to the plurality of the drive lines X1, X2, X3, . . . , Xn−1, and Xn by the control of the control unit 210a.

By the control of the control unit 210a, the touch signal sensing unit 230a may receive the capacitance change sensed by the respective sensing cells "A" from the sensing lines Y1, Y2, Y3, . . . , Ym−1, and Ym, and is able to generate a sensing signal corresponding to the capacitance change. In order to clearly distinguish the touch signal from a touch error, for example, hovering, noise and the like, the touch signal sensor 230a is able to analyze the signal inputted from the touch screen 20 by means of a preset threshold value.

Figure 3:
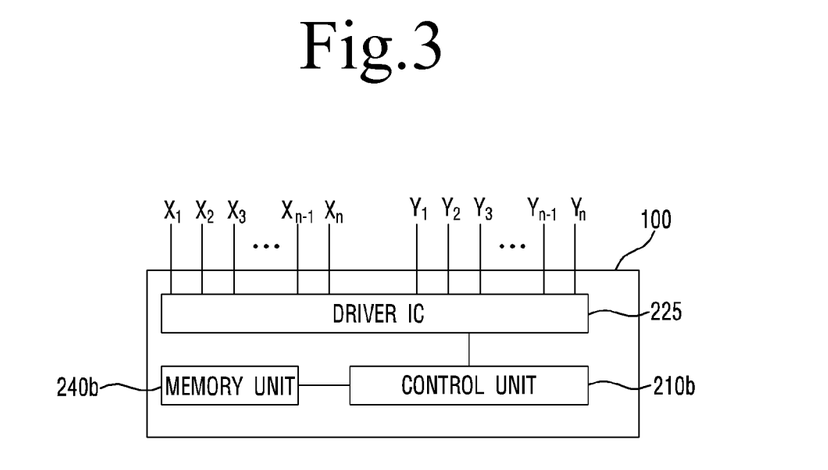
FIG. 3 is a block diagram showing a second embodiment of the touch processor shown in FIG. 1.

FIG. 3 is a block diagram showing a second embodiment of the touch processor shown in FIG. 1.

As shown in FIG. 3, the touch processor 100 may include a control unit 210b, a driver IC 225 and a memory unit 240b. The touch processor 100 is different from the touch processor of FIG. 2 in that the plurality of the drive lines X1, X2, X3, . . . , Xn−1, and Xn and the plurality of the sensing lines Y1, Y2, Y3, . . . , Ym−1, and Ym are connected to the driver IC 225. In other words, the driver IC 225 of the touch processor 100 shown in FIG. 3 is capable of performing both functions of the driving part 220a and the touch signal sensing unit 230a of FIG. 2.

Since the control unit 210b and the memory unit 240b perform the same functions as those of the control unit 210a and the memory unit 240a shown in FIG. 2, a detailed description thereof will be omitted.

Figure 4:
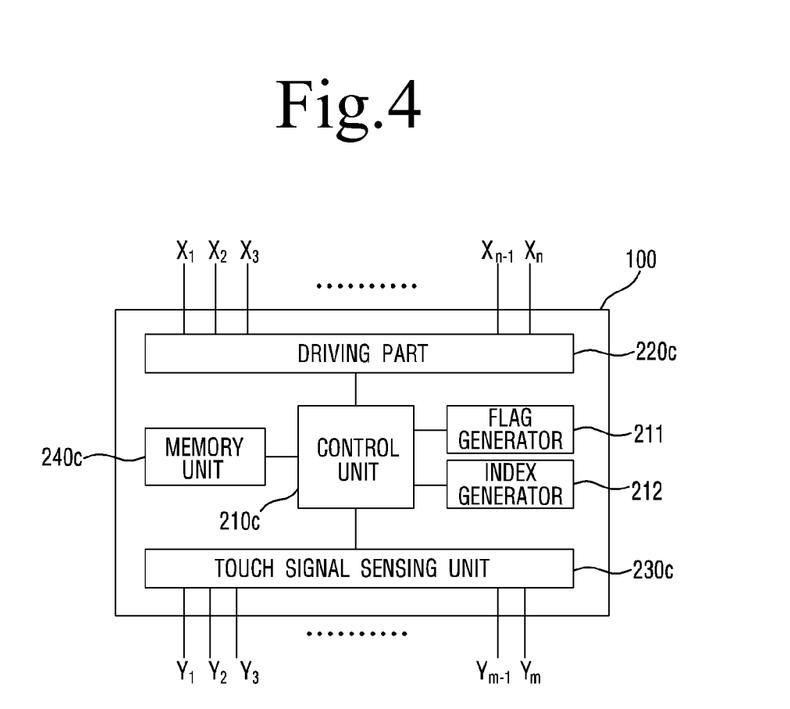
FIG. 4 is a block diagram showing a third embodiment of the touch processor shown in FIG. 1.

FIG. 4 is a block diagram showing a third embodiment of the touch processor shown in FIG. 1.

As shown in FIG. 4, the touch processor 100 a control unit 210c, a flag generator 211, an index generator 212 and a memory unit 240c.

The control unit 210c is able to generally control the touch processor 100 including the flag generator 211 and the index generator 212.

The flag generator 211 gives a flag to the respective touch signals and determines the kind of an object that has inputted the touch signal. The control unit 210c identifies the feature information of the first object or the feature information of the second object, and the flag generator 211 gives a flag to a touch signal corresponding to the feature information, thereby distinguishing between the first object and the second object. Here, the touch processor 100 independently and respectively processes at least two touch operation modes in accordance with the distinguished object.

The index generator 212 gives the same index to a touch signal satisfying the index matching condition among the touch signals to which the flag has been given from the flag generator 211, and gives a different index to a touch signal not satisfying the index matching condition. In the touch processor 100, the index generator 212 gives the index to the corresponding touch signal, so that it is possible to detect and distinguish multiple and simultaneous touches on the touch screen 20, and to distinguish single touch and dual touch. Here, the index matching condition may be obtained by using, for example, a touch input time difference or a distance between the touches, etc.

The memory unit 240c may be comprised of a program memory and data memories. Here, the program memory may store a program to drive the touch processor 100. The data memory may store the flag generated from the flag generator 211 and/or the index generated from the index generator 212.

In the embodiment, the touch processor 100 may further include a driving part 220c and a touch signal sensing unit 230c.

The driving part 220c may sequentially apply a driving signal to the plurality of the drive lines X1, X2, X3, . . . , Xn−1, and Xn.

By the control of the control unit 210c, the touch signal sensing unit 230c may receive the capacitance change sensed by the respective sensing cells "A" from the sensing lines Y1, Y2, Y3, . . . , Ym−1, and Ym, and is able to generate a sensing signal corresponding to the capacitance change. In order to clearly distinguish the touch signal from a touch error, for example, hovering, noise and the like, the touch signal sensor 230c is able to analyze the signal inputted from the touch screen 20 by means of a preset threshold value.

Continuously, a method for controlling the touch screen of the touch screen controller according to the embodiment of the present invention will be described.

Figure 5:
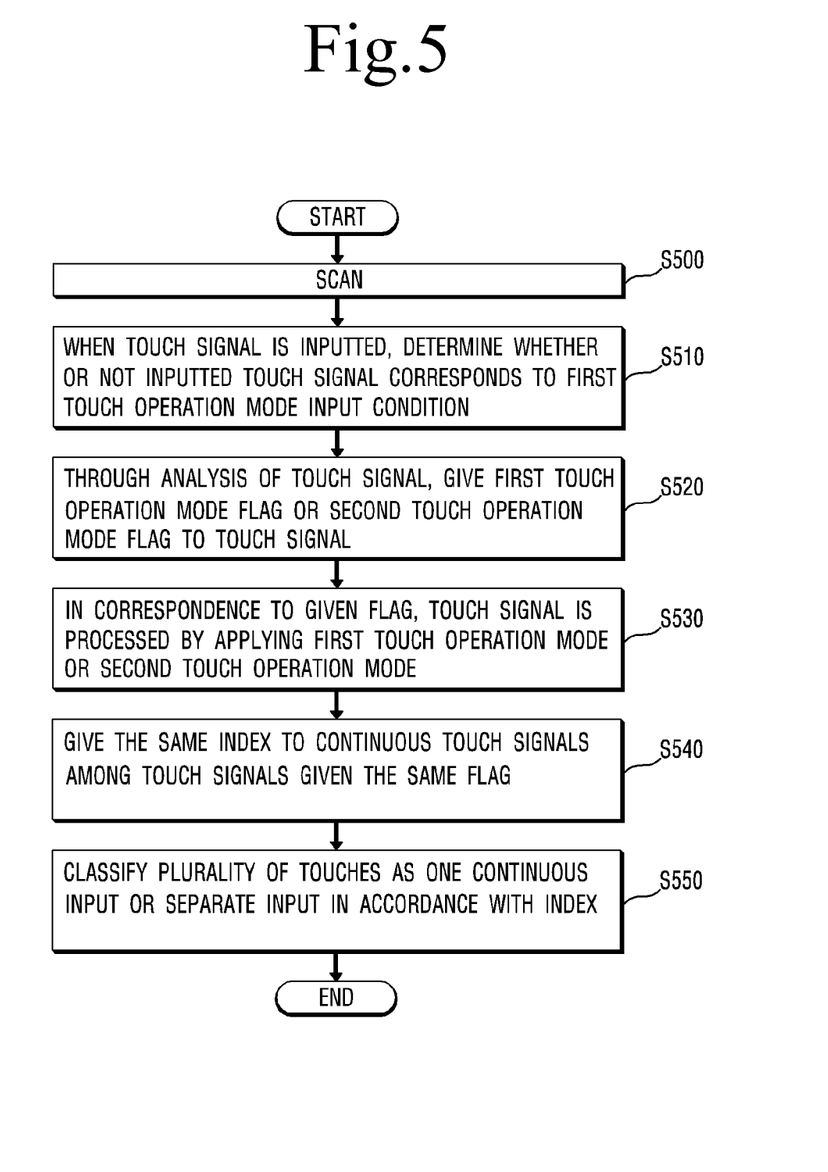
FIG. 5 is a flowchart showing a first embodiment of a method for controlling the touch screen of the touch screen controller according to the embodiment of the present invention.

FIG. 5 is a flowchart showing a first embodiment of a method for controlling the touch screen of the touch screen controller according to the embodiment of the present invention.

The method for controlling the touch screen of the touch screen controller according to the embodiment of the present invention may be performed by the operation of the touch processor 100.

As shown in FIGS. 1 and 5, the method for the touch screen 20 is performed as follows. Scanning is performed whether the touch signal is inputted to the touch screen 20 or not (S500). The scanning is performed by sensing the mutual capacitance change of the sensing cell "A" formed by the plurality of the drive lines and the plurality of the sensing lines, so that the touch input is distinguished from hovering, noise, etc., by using the sensed change amount, a threshold value, etc. When it is determined that a touch signal is inputted, it is determined whether the inputted touch signal corresponds to a first touch operation mode input condition or not (S510). Then, through the analysis of the touch signal, a first touch operation mode flag or a second touch operation mode flag is given to the touch signal (S520). That is, when the touch signal corresponds to the first touch operation mode input condition, the first touch operation mode flag is given to the touch signal, and when the touch signal does not correspond to the first touch operation mode input condition, the second touch operation mode flag is given to the touch signal. In correspondence to the given flag, the touch signal is intended to be processed by applying the first touch operation mode or the second touch operation mode (S530). In other words, the objects for touch input are distinguished by the flag, so that the touch signal can be independently processed by applying the first touch operation mode or the second touch operation mode. Therefore, at least two touch operation modes can be processed in accordance with the object touched on the touch screen 20.

Also, in the embodiment, each of the first and the second touch operation modes may give the same index to continuous touch signals among the touch signals given the same flag (S540), and may classify the plurality of the touches inputted to the touch screen 20 as one continuous input or a separate input in accordance with the index (S550). That is, the plurality of the touch inputs given the same index can be recognized as a single touch and be represented to be connected to each other.

In the embodiment, though the processes S510 to S520 related to the operation to give the flag and the process S540 related to the operation to give the index have been sequentially described, the processes may be performed in a reverse direction to the above-mentioned direction. Therefore, the concept of the present invention is not limited to the sequential relationship between the processes S510 to S520 related to the operation to give the flag and the process S540 related to the operation to give the index.

Figure 6:
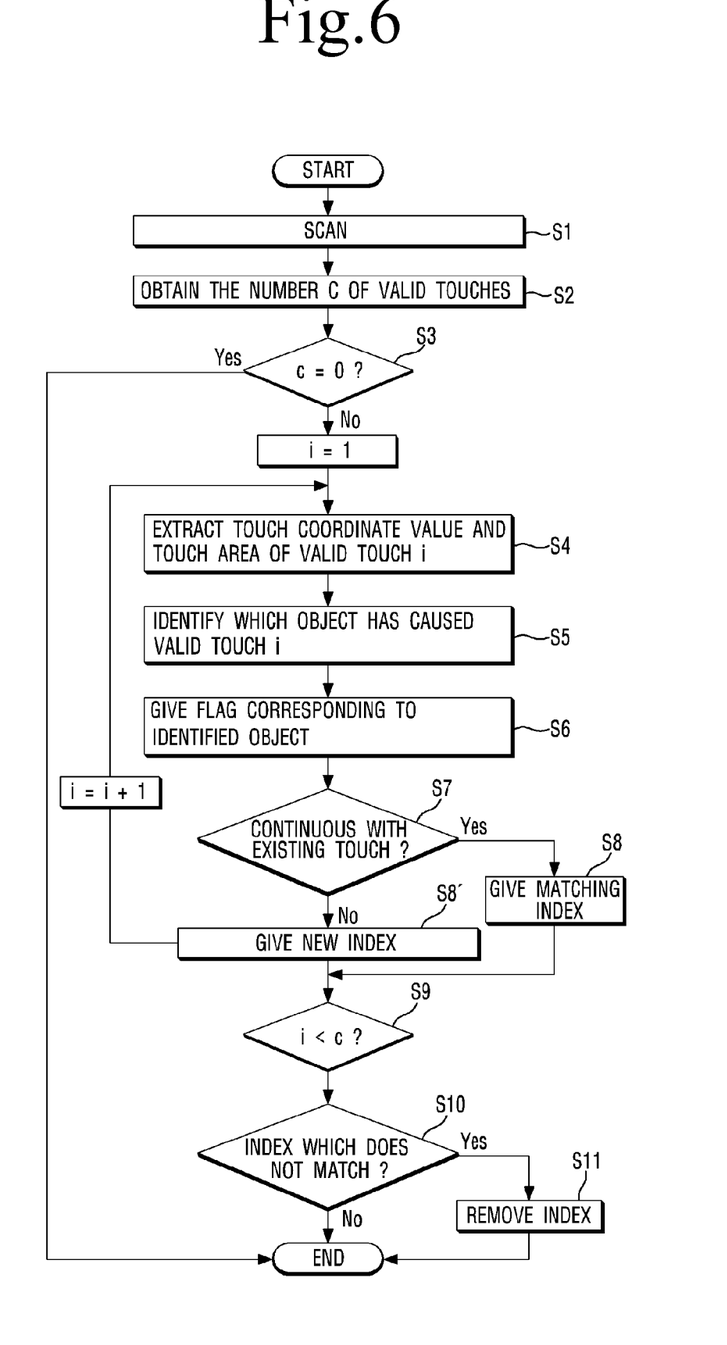
FIG. 6 is a flowchart showing a second embodiment of the method for controlling the touch screen of the touch screen controller according to the embodiment of the present invention.

FIG. 6 is a flowchart showing a second embodiment of a method for controlling the touch screen of the touch screen controller according to the embodiment of the present invention.

As shown in FIGS. 1 and 6, scanning is performed whether the touch signal is inputted to the touch screen 20 or not (S1).

Through the scanning, a mutual capacitance (MC) between the drive lines and the sensing lines is generated at the crossings formed by the arrangement of the drive lines X1, X2, X3, . . . , Xn−1, and Xn and the sensing line Y1, Y2, Y3, . . . , Ym−1, and Ym. Each crossing where the mutual capacitance has been generated is able to perform a function of the sensing cell "A" that enables the touch recognition.

However, when the driving signal is applied from the touch processor 100 to the drive line connected to the each sensing cell "A", the mutual capacitance generated at each sensing cell "A" generates a coupled sensing signal to the sensing line connected to the each sensing cell "A".

That is, when the driving signal is applied to the drive line connected to the each sensing cell "A", the mutual capacitance generated at each sensing cell "A" is sensed through the sensing line connected to the each sensing cell "A".

Also, the touch processor 100 sequentially provides the driving signal to the each drive line. Accordingly, when the touch processor 100 provides the driving signal to any one of the drive lines X1, X2, X3, . . . , Xn−1, and Xn, the other drive lines other than the drive line provided with the driving signal remain grounded.

Accordingly, the mutual capacitance is respectively generated at a plurality of crossings, i.e., the sensing cells "A" formed by the plurality of the sensing line Y1, Y2, Y3, . . . , Ym−1, and Ym crossing the driving signal-applied drive line. When an object like a person's finger, a stylus pen, etc., contacts with the sensing cells "A", the capacitance change occurs at the corresponding sensing cells "A".

In summary, as shown in FIG. 1, the touch screen 20 according to the embodiment of the present invention can be represented by a mutual capacitance circuit. The touch screen 20 includes the drive lines X1, X2, X3, . . . , Xn−1, and Xn and the sensing lines Y1, Y2, Y3, . . . , Ym−1, and Ym. The drive lines and the sensing lines are spatially separated, so that a capacitive couple node, i.e., the sensing cell "A" is formed. Here, the drive lines X1, X2, X3, . . . , Xn−1, and Xn may be connected, as shown in FIG. 2 or 4, to the driving parts 220a and 220c represented as a voltage source or may be connected, as shown in FIG. 3, to the driver IC 225. The sensing lines Y1, Y2, Y3, . . . , Ym−1, and Ym may be connected, as shown in FIG. 2 or 4, to the touch signal sensing units 230a and 230c or may be connected, as shown in FIG. 3, to the driver IC 225.

Also, the drive lines X1, X2, X3, . . . , Xn−1, and Xn and the sensing lines Y1, Y2, Y3, . . . , Ym−1, and Ym may include a predetermined parasitic capacitance respectively.

As described above, when there is no conductive object (finger or stylus pen) that accesses the crossings of the drive lines X1, X2, X3, . . . , Xn−1, and Xn and the sensing line Y1, Y2, Y3, . . . , Ym−1, and Ym, that is to say, the sensing cells "A", the mutual capacitance (MC) generated at the sensing cell "A" is not changed. However, when the conductive object accesses or contacts with the sensing cell "A", the mutual capacitance is changed. As a result, the change the mutual capacitance causes a change of current and/or voltage transmitted to the sensing line connected to the sensing cell "A".

Then, it is determined whether the scanned input signal is a valid touch signal or not.

Here, the touch applied to the touch screen 20 may be thought as a time event sequence that includes, for example, access or hovering of the touch object, touching down of the touch object onto the touch surface, maintenance time or duration time of the touch, drag motion of the touch object over the touch surface (or motion of the touch object while maintaining a predetermined distance from the touch surface without direct contact with the touch surface), and lift-off of the touch object from the touch surface.

Accordingly, it is important for the touch screen 20 to identify whether the signal is derived from the hovering or touching and to distinguish between them.

For the purpose of clearly determining whether the signal is derived from the hovering or touching, a threshold value may be set in advance by the touch processor 100. As shown in FIG. 2 or 4, when the touch processor 100 includes the driving parts 220a and 220c and the touch signal sensing units 230a and 230c, the threshold value may be determined by the touch signal sensing units 230a and 230c. As shown in FIG. 3, when the touch processor 100 includes the driver IC 225, the threshold value may be determined by the driver IC 225. The threshold value may be dynamically determined based on a predetermined value or, for example, surroundings, background noise, and a capacitance change amount difference of each touch object. When the touch signal exceeds the threshold value, it is determined whether the signal is derived from the hovering or touching.

The touch signal sensing units 230a or 230c or the driver IC 225 collects the capacitance change amount of the each sensing cell "A" corresponding to the valid touch and outputs the capacitance change amount of the each sensing cell "A" to the control units 210a, 210b and 210c in every scanning cycle in which the reception of detection of the capacitance changes of all the sensing cells "A" is completed. In other words, when multi-touches occur, the capacitance change amount of the each sensing cell "A" caused by a plurality of the objects is outputted every scanning cycle. Also, the touch signal sensing unit may output the capacitance change amount of the each sensing cell "A" corresponding to the valid touch to the control units 210a, 210b and 210c, and the control units 210a, 210b and 210c may collect the capacitance change amount of the each sensing cell "A" in every scanning cycle.

The number "c" of the valid touches collected in every scanning cycle is obtained (S2). It is determined whether the valid touch is present or not (S3). If the valid touch is present, the touch coordinate value and touch area of the valid touch are extracted (S4). If the valid touch is not present, it is determined that no touch has occurred, and processing ends. Here, "i" of FIG. 6 represents the dummy number of routing of S4 to S9.

Among the capacitance change amounts of the sensing cells "A", which have been inputted from the touch signal sensing units 230a and 230c or the driver IC 225, the touch coordinate value of the invalid touch can be calculated on the basis of a minimal point with a capacitance change amount equal to or less than the capacitance change amounts of four neighboring sensing cells "A" and on the basis of a maximal point with a capacitance change amount equal to or greater than the capacitance change amounts of four neighboring sensing cells "A".

The touch area of the valid touch can be defined to include the sensing cells "A" within a predetermined distance in up, down, right and left directions with respect to the sensing cell "A" corresponding to the touch coordinate value of the valid touch. Also, the touch signal sensing units 230a and 230c or the driver IC 225 performs at least one of S2 to S4, thereby outputting at least one of the number "c" of the valid touches, and the coordinate value and touch area of the valid touch to the control units 210a, 210b and 210c.

Then, it is determined that the touch input conditions of which of the objects are satisfied by the valid touch, so that it is identified which object has caused the valid touch (S5).

Hereafter, the process of S5 will be taken as an example for description.

First, when the object touched on the touch screen 20 is a stylus pen, an area composed of the sensing cells "A" with the changed capacitance may be very small and may generally have a circular shape. The central point of the touch area may be almost the same as the touch coordinate value.

Meanwhile, when the object touched on the touch screen 20 is a person's finger, the area composed of the sensing cells "A" with the changed capacitance may be greater the touch area of the stylus pen and less than a certain area. The area composed of the sensing cells "A" generally has a circular or elliptical shape.

Accordingly, in S5, at least one touch signal parameter, for example, a sum of the capacitance change amount of each of the sensing cells "A" within the touch area, the number of the sensing cells "A" with the capacitance change amount greater than a predetermined capacitance change amount within the touch area, and the number of the sensing cells "A" of which the capacitance change amount is greater than a predetermined rate of the maximum capacitance change amount or minimum capacitance change amount within the touch area, a ratio of a sum of a predetermined number of the upper capacitance change amounts to a sum of the predetermined number of the lower capacitance change amounts within the touch area, etc., is compared with the threshold value by use of the characteristics of the capacitance change amount of the touched object, so that it is possible to determine the touch input conditions of which of the objects are satisfied by the valid touch.

Figure 7A:
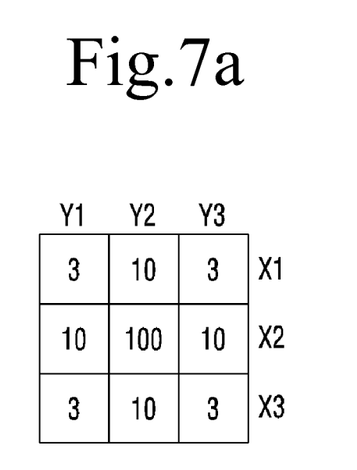
FIGS. 7a and 7b are views showing the capacitance change amount at the time of touching the touch screen of the embodiment of the present invention with the stylus pen.
Figure 7B:
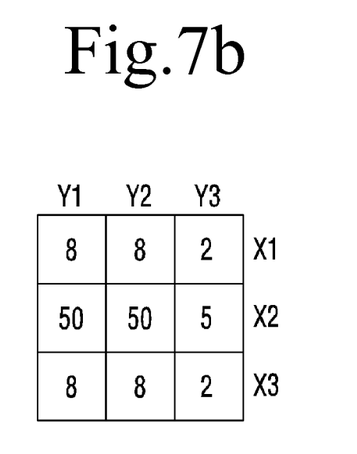
Figure 8A:
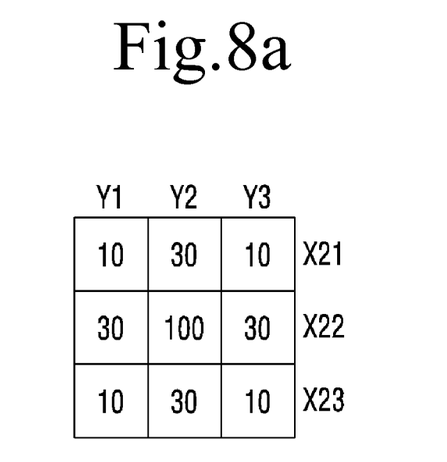
FIGS. 8a and 8b are views showing the capacitance change amount at the time of touching the touch screen of the embodiment of the present invention with the finger.
Figure 8B:
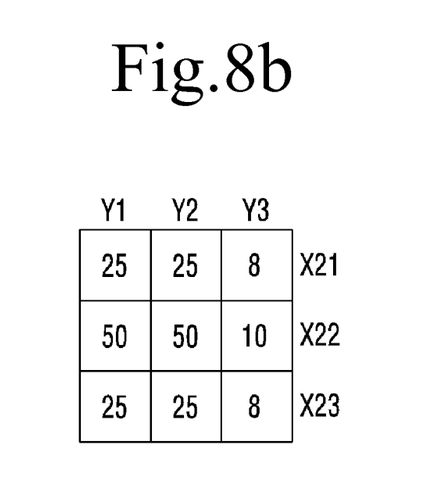

FIGS. 7a and 7b are views showing the capacitance change amount of the each sensing cell "A" within the touch area at the time of touching the touch screen of the embodiment of the present invention with the stylus pen. FIGS. 8a and 8b are views showing the capacitance change amount of the each sensing cell "A" within the touch area at the time of touching the touch screen of the embodiment of the present invention with the finger.

Here, FIGS. 7a and 8a show one sensing cell with the maximum capacitance change amount within the touch area respectively. FIGS. 7b and 8b show two or more sensing cell with the maximum capacitance change amount within the touch area respectively.

The following table 1 is used for describing the process of S5 of FIG. 6.

|  | FIG. 7a | FIG. 7b | threshold value | FIG. 8a | FIG. 8b |
|---|---|---|---|---|---|
| a sum of capacitance change amount | 152 | 141 | 180 | 260 | 226 |
| the number of sensing cells of which the capacitance change amount is greater than 20 | 1 | 2 | 3 | 5 | 6 |
| the number of the sensing cells of which the capacitance change amount is equal to or greater than 25% of the maximum capacitance change amount | 0 (>25) | 1 (>12.5) | 3 | 4 (>25) | 5 (>12.5) |
| a sum of four upper capacitance change amounts/a sum of four lower capacitance change amounts | 10.8 (130/12) | 6.8 (116/17) | 6 | 4.75 (190/40) | 2.9 (150/51) |

Referring to FIGS. 7a, 7b, 8a and 8b and the table 1, according to the process method of S5, first, the sums of the capacitance change amounts of respective sensing cells "A" within the touch area are compared with a threshold value. That is, when the sum of the capacitance change amount of the sensing cell "A" within the touch area is less than a threshold value of 180, the process of S5 determines that the touch signal is inputted by the stylus pen. For example, as shown in FIG. 7a, the sum of the capacitance change amount of the sensing cell "A" within the touch area is 152 (=100+10+10+10+3+3+3+3), or as shown in FIG. 7b, the sum of the capacitance change amount of the sensing cell "A" within the touch area is 141. On the contrary to this, when the sum of the capacitance change amount of the sensing cell "A" within the touch area is greater than the threshold value, the process of S5 determines that the touch signal is inputted by the finger. For example, as shown in FIG. 8a, the sum of the capacitance change amount of the sensing cell "A" within the touch area is 260, or as shown in FIG. 8b, the sum of the capacitance change amount of the sensing cell "A" within the touch area is 226.

Also, according to the process method of S5, the number of the sensing cells "A" with the capacitance change amount greater than a predetermined capacitance change amount within the touch area is compared with a threshold value. In other words, when a predetermined capacitance change amount is set to be 20, and when the number of the sensing cells "A" with the capacitance change amount greater than 20 within the touch area is less than a threshold value of 3, the process of S5 determines that the touch signal is inputted by the stylus pen. For example, as shown in FIG. 7a, the number of the sensing cells "A" with the capacitance change amount greater than 20 within the touch area is 1 (100), or as shown in FIG. 7b, the number of the sensing cells "A" with the capacitance change amount greater than 20 within the touch area is 2 (50, 50). On the contrary to this, when the number of the sensing cells "A" with the capacitance change amount greater than 20 within the touch area is greater than the threshold value, the process of S5 determines that the touch signal is inputted by the finger. For example, as shown in FIG. 8a, the number of the sensing cells "A" with the capacitance change amount greater than 20 within the touch area is 5, or as shown in FIG. 8b, the number of the sensing cells "A" with the capacitance change amount greater than 20 within the touch area is 6.

Also, according to the process method of S5, the number of the sensing cells "A" of which the capacitance change amount is greater than a predetermined rate of the maximum capacitance change amount or minimum capacitance change amount within the touch area is compared with a threshold value. In other words, when the predetermined rate is set to be 25%, and when the number of the sensing cells "A" of which the capacitance change amount is greater than 25% of the maximum capacitance change amount within the touch area is less than a threshold value of 3, the process of S5 determines that the touch signal is inputted by the stylus pen. For example, as shown in FIG. 7a, the number of the sensing cells "A" of which the capacitance change amount is greater than 25% of the maximum capacitance change amount within the touch area is 0, or as shown in FIG. 7b, the number of the sensing cells "A" of which the capacitance change amount is greater than 25% of the maximum capacitance change amount within the touch area is 1 (50). On the contrary to this, when the number of the sensing cells "A" of which the capacitance change amount is greater than 25% of the maximum capacitance change amount within the touch area is greater than the threshold value, the process of S5 determines that the touch signal is inputted by the finger. For example, as shown in FIG. 8a, the number of the sensing cells "A" of which the capacitance change amount is greater than 25% of the maximum capacitance change amount within the touch area is 4, or as shown in FIG. 8b, the number of the sensing cells "A" of which the capacitance change amount is greater than 25% of the maximum capacitance change amount within the touch area is 5.

Also, according to the process method of S5, a ratio of a sum of a predetermined number of the upper capacitance change amounts to a sum of the predetermined number of the lower capacitance change amounts within the touch area is compared with a threshold value. In other words, when the predetermined number is set to be 4, and when the ratio of the sum of four upper capacitance change amounts within the touch area to the sum of four lower capacitance change amounts within the touch area is greater than a threshold value of 6, the process of S5 determines that the touch signal is inputted by the stylus pen. For example, as shown in FIG. 7a, the ratio is 10.8 (=130÷12), or as shown in FIG. 7b, the ratio is 6.8 (=116÷17). On the contrary to this, when the ratio of the sum of four upper capacitance change amounts within the touch area to the sum of four lower capacitance change amounts within the touch area is less than a threshold value, the process of S5 determines that the touch signal is inputted by the finger. For example, as shown in FIG. 8a, the ratio is 4.75 (=190÷40), or as shown in FIG. 8b, the ratio is 2.9 (=150÷51).

The threshold value of the each method may be adjusted so as to distinguish the touch objects.

Continuously, a flag corresponding to the object determined in S5 is given to the touch signal (S6).

Therefore, it is important for the touch screen to identify which object has generates the touch signal. Here, in S6, the flag is given in order to clearly distinguish a source that has touched the touch screen.

Continuously, after the flag is given to the touch signal in S6, it is determined whether or not the touch satisfies the index matching conditions of the existing indices of the existing flag, and then, it is identified whether or not the touch is continuous with the touch detected in the previous scanning cycle (S7).

The index matching condition may be formed based on a distance, etc., between the touch coordinate value and the coordinate value of the touch signal that has been detected in the previous scanning cycle and has the same flag.

Continuously, when the index matching condition is satisfied in S7, the matching index is given to the touch signal (S8). Also, when index matching conditions are not satisfied, it is determined that a new touch has been inputted, and thus a new index is given (S8').

Therefore, it is important for the touch screen to identify whether the touch signal is continuous with the existing touch or is a new touch. Here, in S8 and S8', the index is given in order to clearly distinguish the continuity of the touch of the touch screen.

For example, when a user moves the stylus pen in a particular direction, the touch signal is given the same index is recognized as a continuous touch, so that the screen or image object is moved.

The foregoing steps of giving the flag and index in S4 to S8 or S4 to S8' are performed with respect to all valid touches determined in S2 (S9).

After the flag and the index are given to all valid touches, it is determined whether or not an existing index in a previous scanning cycle is present which does not satisfy the index matching condition with respect to any valid touch (S10). When an existing index in a previous scanning cycle is present which does not satisfy the index matching condition with respect to any valid touch, the index of the corresponding touch signal is removed (S11). That is, when there exists a touch that is not continuous with all valid touches among the existing touches, the existing touch is determined as the final touch, and the index of the corresponding touch signal is removed, so that it is possible to remove errors in determining the continuity of the valid touch in the following scanning cycle.

The above-mentioned embodiment includes a step S11 of removing the index of the previous scanning cycle of the each scanning cycle, and may be changed into a method for removing an index in a previous predetermined scanning cycle such as previous two scanning cycles of the scanning step S1, etc. Through this, a time factor can be adjusted in determining the continuity of the touch.

Additionally, S1 to S11 may be repeated every scanning cycle.

Figure 9:
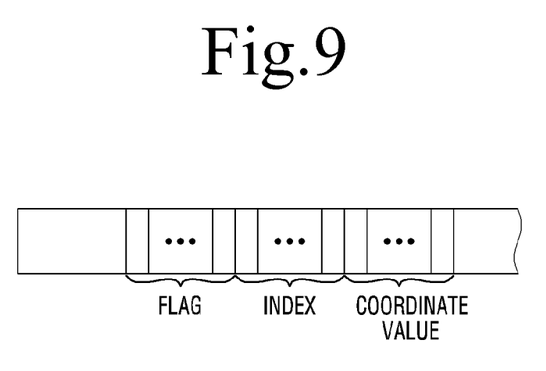
FIG. 9 is a schematic view showing a data format of a touch signal of FIG. 6.

Meanwhile, FIG. 9 is a schematic view showing a data format of the touch signal of FIG. 6. Referring to FIG. 9, the data format of the touch signal given the flag may be composed of the flag and the coordinate value. Also, the data format of the touch signal given the index may be composed of the flag, the index and the coordinate value.

Figure 10:
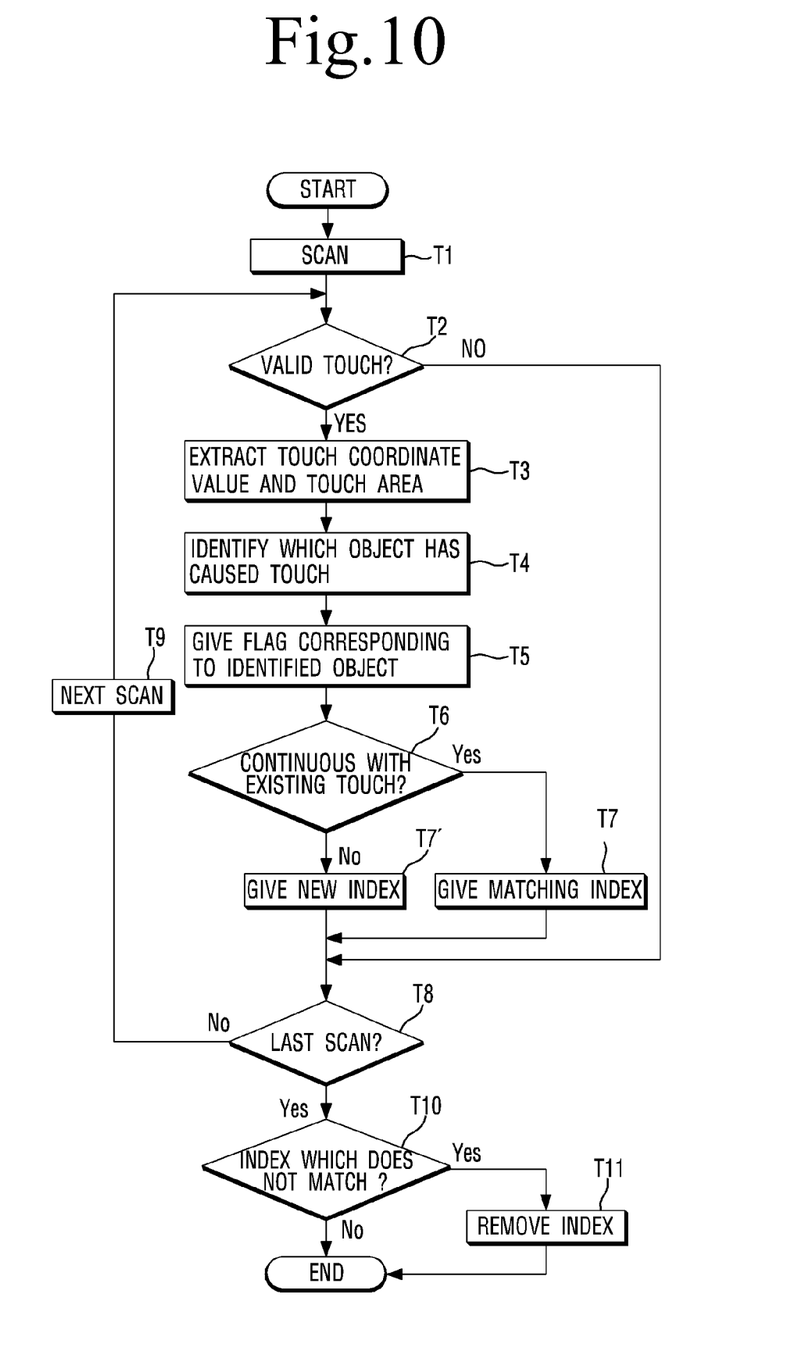
FIG. 10 is a flowchart showing a third embodiment of the method for controlling the touch screen of the touch screen controller according to the embodiment of the present invention.

FIG. 10 is a flowchart showing a third embodiment of the method for controlling the touch screen of the touch screen controller according to the embodiment of the present invention.

As shown in FIGS. 1 and 10, scanning is performed whether the touch signal is inputted to the touch screen 20 or not (T1).

Then, it is determined whether or not the scanned input signal is a valid touch signal (T2). When the input signal is a valid touch signal, the touch coordinate value and touch area of the valid touch depending on the capacitance change amount of the each sensing cell "A" corresponding to the valid touch are extracted (T3). Here, among the capacitance change amounts of the sensing cells "A", which have been inputted from a touch signal sensing units 290, the touch coordinate value of the invalid touch is calculated on the basis of a minimal point with a capacitance change amount equal to or less than the capacitance change amounts of four neighboring sensing cells "A" and on the basis of a maximal point with a capacitance change amount equal to or greater than the capacitance change amounts of four neighboring sensing cells "A". The touch area of the valid touch can be defined to include the sensing cells "A" within a predetermined distance in up, down, right and left directions with respect to the sensing cell "A" corresponding to the touch coordinate value of the valid touch.

Continuously, since the following T4 to T7 or T4 to T7' are the same as S5 to S8 or S4 to S8' of the foregoing first touch screen control method, a detailed description thereof will be omitted.

After the index is given through the T7 or T7', the touch signal sensing units 230a and 230c or the driver IC 225 determines whether the scan is the last scan or not. Meanwhile, in determining whether or not the scanned input signal is a valid touch signal (T2), even when the scanned input signal is not a valid touch signal, the touch signal sensing units 230a and 230c or the driver IC 225 determines whether the scan is the last scan or not (T8).

In the determination of T8, when the scan is not the last scan, the next scanning is performed (T9). Meanwhile, when scan is the last scan, T10 to T11 are continuously performed. Since T10 to T11 are the same as S10 to S11 of the foregoing first touch screen control method, a detailed description thereof will be omitted.

As described above, according to the embodiment of the present invention, even when a single touch detection method is used, the flag is given to each touch signal that the user inputs through the touch screen, so that the touch signal caused by the finger and the touch signal caused by the stylus pen are independently and respectively processed without user's operating each input mode. Therefore, since the finger input and the stylus pen input can be simultaneously performed at a desired point of time, it is convenient for the user to use.

Also, according to the embodiment of the present invention, by giving the index to the same touch signal among the signals given the flag, it is possible to detect and distinguish multiple and simultaneous touches on the touch screen. Since it is possible to detect and distinguish single touch and dual touch, the embodiment of the present invention can be applied not only to an application that receives a touch input which is rapidly continuous or superposed but also to a multi-user application like a multiple-player game.

The foregoing touch screen controller may be applied to a variety of electronic devices.

Figure 11:
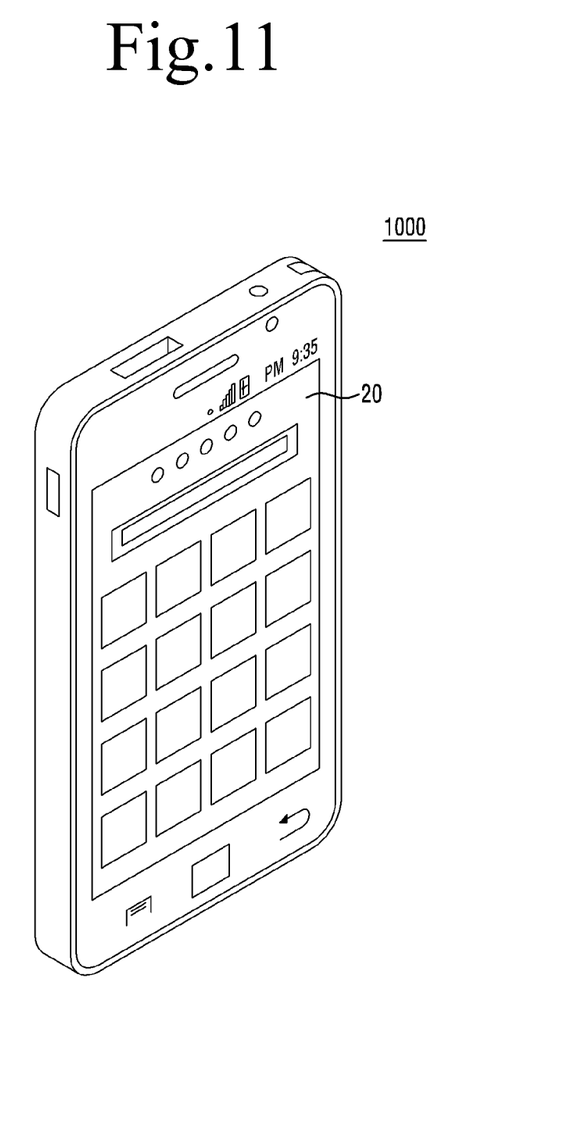
FIG. 11 is a perspective view showing an electronic device equipped with the touch screen controller according to the embodiment of the present invention.

FIG. 11 is a perspective view showing an electronic device equipped with the touch screen controller according to the embodiment of the present invention.

As shown in FIG. 11, the touch screen controller according to the embodiment of the present invention may be applied to an electronic device 1000 such as a cellular phone including the touch screen 20. Since the touch screen controller according to the embodiment processes at least two touch operation modes independently and respectively in accordance with the object touched on the touch screen 20, thereby being advantageous for improving the efficiency of the electronic device 1000 that implements various functions at the same time.

Here, the electronic device 1000 is not limited to the cellular phone shown in FIG. 11. For example, the electronic device 1000 may include a variety of electronic devices, e.g., a mobile electronic device, a laptop computer, a portable computer, a portable multimedia player (PMP), a camcorder, a web tablet, a car navigation system, a personal digital assistant (PDA), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen controller comprising a touch processor configured to:
   process at least two touch operation modes independently and respectively in accordance with an object touched on a touch screen by giving a flag to a touch signal detected by the touch screen in correspondence with the touch signal;
   identify, as a single touch, two different touch signals that are given an identical flag;
   compare a predetermined threshold value with a ratio of a sum of a predetermined number of the upper capacitance change amounts to a sum of the predetermined number of the lower capacitance change amounts within the touch area, and
   then determine which one of the touch operation modes a touch operation mode of the object corresponds to.

2. The touch screen controller of claim 1, wherein the touch processor is configured to process the touch operation modes independently and respectively in accordance with coordinate value information showing a touch location of each of objects touched on the touch screen and mode information showing which one of the touch operation modes the coordinate value information corresponds to.

3. The touch screen controller of claim 1, wherein the touch processor is configured to distinguish the object touched on the touch screen using the flag, and process independently and respectively at least two touch operation modes distinguished by the flag.

4. The touch screen controller of claim 3, wherein the touch processor is configured to give an index to the touch signal that is given the flag in correspondence with the touch signal, and detect and distinguish multiple and simultaneous touches on the touch screen in accordance with the index.

5. The touch screen controller of claim 1, wherein the touch processor is configured to:
   compare a predetermined threshold value with at least one of a sum of a capacitance change amount of each of sensing cells within a touch area, the number of the sensing cells with the capacitance change amount greater than a predetermined capacitance change amount within the touch area, and the number of the sensing cells of which the capacitance change amount is greater than a predetermined rate of a maximum capacitance change amount or a minimum capacitance change amount within the touch area, and
   then determine which one of the touch operation modes a touch operation mode of the object corresponds to.

6. The touch screen controller of claim 1, wherein the touch processor is configured to process a first touch operation mode with respect to a first object touched on the touch screen and process a second touch operation mode with respect to a second object touched on the touch screen.

7. The touch screen controller of claim 6, wherein the touch processor is configured to process a first touch operation mode and a second touch operation mode independently and respectively in accordance with coordinate value information showing a touch location of each of the objects and mode information showing which one of the first and the second touch operation modes the coordinate value information corresponds to.

8. The touch screen controller of claim 6, wherein the touch processor is configured to distinguish between the first object and the second object touched on the touch screen using the flag, and process independently and respectively at least two touch operation modes distinguished by the flag.

9. The touch screen controller of claim 6, wherein the first object is a human finger and the second object is a stylus pen.

10. The touch screen controller of claim 1, wherein the touch processor is configured to identify the two different touch signals as the single touch, when the two different touch signals satisfy a matching condition using a touch input time difference or a distance between the touch signals.

11. The touch screen controller of claim 1, wherein the touch processor is configured to:
   compare a predetermined threshold value with the number of the sensing cells of which the capacitance change amount is greater than a predetermined rate of a maximum capacitance change amount or a minimum capacitance change amount within the touch area, and
   then determine which one of the touch operation modes a touch operation mode of the object corresponds to.

12. A method for controlling a touch screen, comprising:
   processing at least two touch operation modes independently and respectively in accordance with an object touched on the touch screen by giving a flag to a touch signal detected by the touch screen in correspondence with the touch signal;
   identifying, as a single touch, two different touch signals that are given an identical flag;
   comparing a predetermined threshold value with a ratio of a sum of a predetermined number of the upper capacitance change amounts to a sum of the predetermined number of the lower capacitance change amounts within the touch area; and
   then determining which one of the touch operation modes a touch operation mode of the object corresponds to.

13. The method of claim 12, wherein the processing at least two touch operation modes independently and respectively comprises:
   determining whether the touch signal corresponds to a first touch operation mode input condition or not;
   giving either a first touch operation mode flag or a second touch operation mode flag to the touch signal in accordance with a result of determining whether or not the touch signal corresponds to the first touch operation mode input condition; and performing the first touch operation mode in accordance with the touch signal that is given the first touch operation mode flag, and performing the second touch operation mode in accordance with the touch signal that is given the second touch operation mode flag.

14. The method of claim 13, wherein the determining whether a touch signal corresponds to a first touch operation mode input condition or not comprises:
comparing a predetermined threshold value with at least one of a sum of a capacitance change amount of each of sensing cells within a touch area, the number of the sensing cells with the capacitance change amount greater than a predetermined capacitance change amount within the touch area, and the number of the sensing cells of which the capacitance change amount is greater than a predetermined rate of a maximum capacitance change amount or a minimum capacitance change amount within the touch area.

15. The method of claim 13, wherein the determining whether a touch signal corresponds to a first touch operation mode input condition or not comprises:
comparing a predetermined threshold value with the number of the sensing cells of which the capacitance change amount is greater than a predetermined rate of a maximum capacitance change amount or a minimum capacitance change amount within the touch area, and
then determine which one of the touch operation modes a touch operation mode of the object corresponds to.

16. The method of claim 12, wherein the processing at least two touch operation modes independently and respectively further comprises:
giving the same index to continuous touch signal among the touch signals that is given the flag; and
detecting and distinguishing multiple and simultaneous touches on the touch screen in accordance with the index.

17. The method of claim 12, wherein the two different touch signals are identified as the single touch, when the two different touch signals satisfy a matching condition using a touch input time difference or a distance between the touch signals.

* * * * *